SEMI-PERMANENT MAGNETIC MEMORY DEVICE

Filed Dec. 13, 1967 2 Sheets-Sheet 1

INVENTOR
TAKASHI FURUOYA
BY
Hopgood & Calimafde
ATTORNEYS

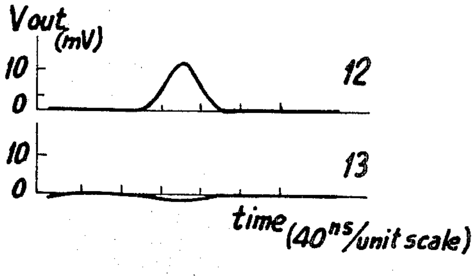
FIG. 5
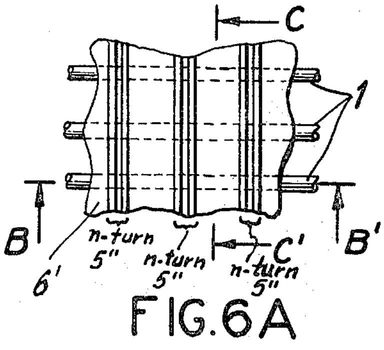
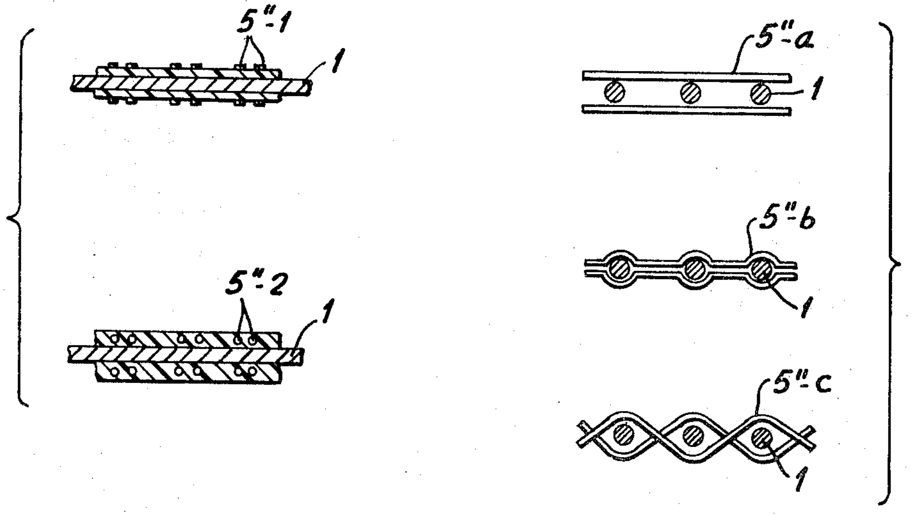
FIG. 6B FIG. 6C
INVENTOR
TAKASHI FURUOYA
BY Hopgood & Calimafde
ATTORNEYS 3,548,390
SEMI-PERMANENT MAGNETIC MEMORY DEVICE
Takashi Furuoya, Tokyo, Japan, assignor to Nippon Electric Company Limited
Filed Dec. 13, 1967, Ser. No. 690,186
Claims priority, application Japan, Dec. 14, 1966, 41/81,917
Int. Cl. G11c *5/02, 11/14, 17/00*
U.S. Cl. 340—174 5 Claims

ABSTRACT OF THE DISCLOSURE

A semi-permanent memory device is provided in the form of a matrix comprising a plurality of magnetic wires arranged in parallel with each other, the magnetic wire consisting essentially of a non-magnetic conductive wire having superimposed on the surface thereof thin films of a soft magnetic material and a hard magnetic material having uniaxial magnetic anisotropy. A plurality of spaced elongated non-magnetic conductors are also provided which intersect the magnetic wires at substantially right angles thereof, small magnetized magnets being disposed in the vicinities of the predetermined intersections.

This invention relates to a novel semi-permanent memory device and particularly to a novel magnetic wire used in the semi-permanent memory device.

As a semi-permanent memory device, it is known to employ a twistor memory device in which a lattice is made by twistor wires made of non-magnetic fine wires wound spirally with an elongated narrow permalloy foil and driving wires set to intersect at right angles with the twistor wires, each portion of the permalloy foil at the intersections of the two wires being used as a memory element. In case a small permanent magnet is set upon one of the intersections, magnetization of the permalloy foil portion at the intersection is fixed by the small magnet, with the result that even if a driving current is made to flow through the driving wire, the magnetization is not reversed and hence no output voltage is gained at the core wire of the twistor wire. On the other hand, at the intersection where no small magnet is set, the magnetization is reversed in response to the driving current to produce an output voltage. Thus, by setting small magnets upon desired intersections, information corresponding to either the presence or absence of the small magnet can be stored. Further details of the twistor memory device are described in, for example, "Bell Laboratories Record," June 1965, pp. 229–235. In the manufacture of the twistor wires, however, a considerably high level technique is required to wind a very thin and very narrow permalloy foil around a core wire with great accuracy. Furthermore, since the permalloy foil is thick as compared with an ordinary thin magnetic film, the twistor wire has a defect of being slow in its magnetization-reversing speed (or switching speed) and of being unable to obtain a high responding speed sufficient to be used in a high-speed semi-permanent memory device.

The object of this invention is to provide a new improved means which is to be used in place of the conventional twistor wire.

This invention is featured by use of non-magnetic conductive wire coated with composite thin magnetic films (hereafter referred to as "magnetic wire") instead of the conventional twistor wire. The composite thin magnetic films comprise a thin film of a hard magnetic material (hereafter shortened to "thin hard-magnetic film") and a thin film of a soft magnetic material (hereafter shortened to "thin soft-magnetic film"), both of which have uniaxial magnetic anisotropy. According to this invention, a plurality of the magnetic wires as mentioned above and a plurality of non-magnetic, conductive wires are arranged to intersect at substantially right angles with each other, thus forming a lattice. Upon the predetermined intersections of the two wires, magnetized small magnets are disposed to store the predetermined information.

One of the advantages of this invention is that the magnetic wires can be prepared with low production cost, because it is able to make the magnetic wire by coating the core wire continuously with thin magnetic films by way of, for example, electroplating technique, instead of winding the permalloy foil around the core wire as in manufacture of the twistor wires. The other advantages reside in that since the thin soft-magnetic film is very thin, the switching speed (the speed in reversal of direction of magnetization) is so high that it is able to obtain the semi-permanent memory device having a speed higher than the twistor memory device, and further in that by adopting the composite magnetic films of the described type, a stable output can be obtained constantly even where the easy axis of magnetization of the thin magnetic film is rectangular to the direction of the driving magnetic field.

The above and other features and advantages of this invention will be apparent from the following more particular description of a preferred embodiment of this invention, as illustrated in the accompanying drawings.

In the drawings:

FIG. 5 represents the waveforms of the output voltages for explaining the information-storage function of the semi-permanent memory device; and FIG. 6 shows examples of variation of the lattice made by the magnetic wire and the driving wire FIG. 6A being a schematic plan view and FIGS. 6B and 6C being cross sections taken along the lines B–B′ and C–C′ of FIG. 6A respectively.

Figure 1A:
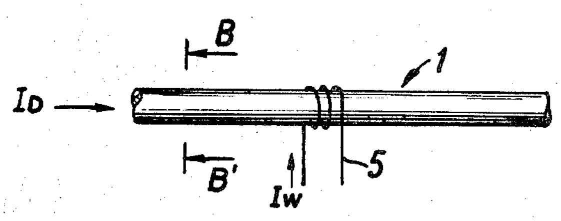
FIG. 1A is a schematic perspective view of one example of the magnetic wire of this invention with a driving wire.
Figure 1B:
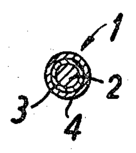
FIG. 1B is a cross-sectional view of the magnetic wire of FIG. 1A taken along the line B–B′ of FIG. 1A.
Figure 2:
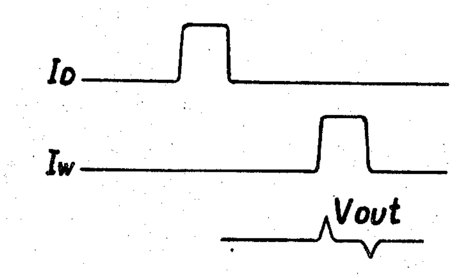
FIG. 2 shows the waveforms of current pulses to be applied to the magnetic wire and the driving wire and of an output voltage obtained across the magnetic wire and the time relations of these pulses and the output voltage.
Figure 3:
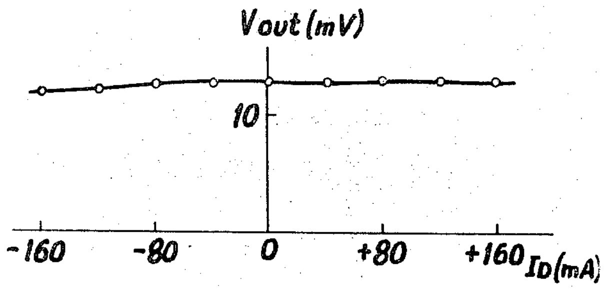
FIG. 3 shows the storage characteristics of the magnetic wire of FIG. 1.

In a preferred embodiment a magnetic wire 1 shown in FIG. 1B was produced by electroplating a core wire 2 of Phosphor bronze of 0.2 mm. in diameter with cobalt (Co) up to the thickness of approximately 300 angstrom to form a thin Co film or a hard-magnetic thin film 3 over the core wire 2 while applying a magnetic field in the circumferential direction of the core wire to align the easy axis of magnetization of the hard-magnetic thin Co film in the same circumferential direction, and thereafter electroplating further with the alloy of Fe and Ni (Fe 18%; Ni 82%) up to the thickness of approximately 8,000 angstrom to form a thin Fe-Ni alloy film or a soft-magnetic thin film 4 over the hard-magnetic film 3 while a magnetic field is also kept applied in the circumferential direction of the core wire to align the easy axis of magnetization of the soft-magnetic Fe-Ni alloy film in the same circumferential direction. In order to evaluate the storage characteristics of the magnetic wire 1, a driving wire 5 made of a fine conductor was wound three times around the magnetic wire 1, as schematically shown in FIG. 1A. Referring to both FIG. 1A and FIG. 2, a current pulse $I_D$ having the pulse duration of 300 nsec. was first made to flow through the magnetic wire 1. After the elapse of suitable time interval (1$\mu$ sec. in this embodiment), a driven current pulse $I_w$ of 600 ma. in amplitude, 200 nsec. in pulse duration and 60 nsec. in rise time was made to flow through the driving wire 5. As a result, an output voltage $V_{out}$ was produced across the magnetic wire. Varying the amplitude and direction of $I_D$ from +160 ma. to −160 ma., the amplitude of the obtained output voltage $V_{out}$ was measured. The result is shown in FIG. 3. FIG. 3 reveals that the output voltage of the same polarity and of the substantially invariable amplitude (approx. 13 mv.) is obtained even when the polarity of $I_D$ is changed and even when the amplitude of $I_D$ varies from 0 to 160 ma. This means that the direction of magnetization of the soft-magnetic thin Fe-Ni alloy film, even if reversed by the magnetic field of the opposite circumferential direction to the original direction of magnetization of the soft-magnetic thin film, which magnetic field is stronger than the coercive force $H_C$ (approximately 2 oersted) and produced by $I_D$ of either polarity, or even if inclined to the axial direction by the driving magnetic field due to the driving current $I_W$, tends to be restored as soon as the applied magnetic field disappears. This effect is due to the fact that the coercive force $H_C$ (approx. 120 oersted) of the hard-magnetic thin Co film is so strong that the magnetization of the soft-magnetic thin film is always directed to the direction of the magnetization of the hard-magnetic thin film. It follows that the amplitude of $I_D$ and $I_W$ should be not so large that the magnetic field produced thereby exceeds the coercive force of the hard-magnetic thin film to change the direction of the magnetization of that film, or vice versa. Thus, the soft-magnetic thin film, even if the magnetization thereof should be changed under the influence of either the magnetic field brought about by $I_D$ or the driving magnetic field, restores the same magnetized state as was before the application of $I_D$ and $I_W$ soon after the magnetic field disappears, provided that the magnetized state of the hard-magnetic thin film remains unchanged, and hence the output voltage of the same polarity can be taken out. Therefore, the magnetic wire having the easy axis of magnetization in its circumferential direction can replace the twistor wire in which the easy axis of magnetization is inclined at the 45° from the circumferential direction. As a result, change in the magnetic flux is larger at the time of reversal of magnetization and hence the output voltage obtained is larger in the magnetic wire of this invention, as compared with the twistor wire.

It has been confirmed that the thin Co film should be of the thickness between 250 and 500 angstroms. If the thin Co film of the thickness is less than 250 angstroms, the corecive force thereof is too weak to maintain the direction of magnetization of the soft-magnetic film in one direction, while if more than 500 angstroms the coercive force is so strong as to lower the output voltage. Co-Ni alloy, Co-Fe alloy, Co-Fe-Ni alloy, or other hard magnetic materials may be used for the hard-magnetic thin film, instead of Co. In this case, the effective film thickness should be determined in consideration of the coercive force of the film. As for the Fe-Ni film, the film thickness should be between 6,000 and 12,000 angstroms, the thinner thickness lowering the output voltage and the thicker thickness weakening the corercive force. A small amount of Mo or P may be added to the Fe-Ni alloy in order to improve the squareness of the hysteresis loop of the soft-magnetic film. It it noted that the similar result is obtainable even with a magnetic wire in which a soft-magnetic thin film is disposed under a hard-magnetic thin film.

Figure 4A:
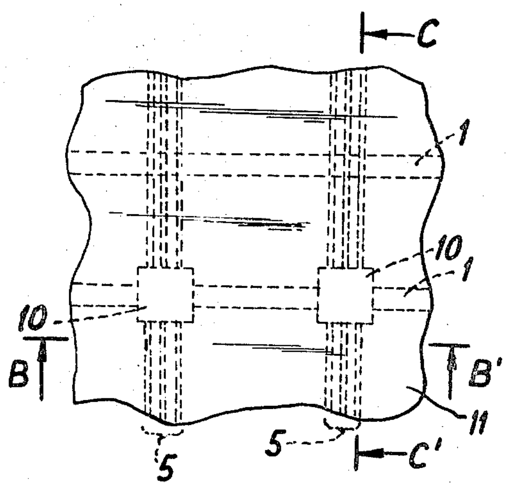
FIG. 4A is a schematic plan view of a part of the semi-permanent memory device of a preferred embodiment of this invention.
Figure 4B:
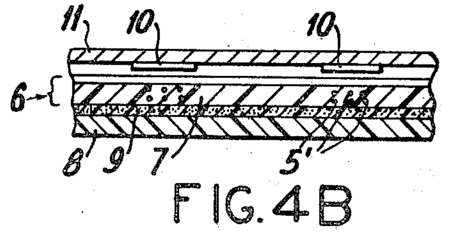
FIG. 4B is a cross section taken along the line B–B′ of FIG. 4A.
Figure 4C:
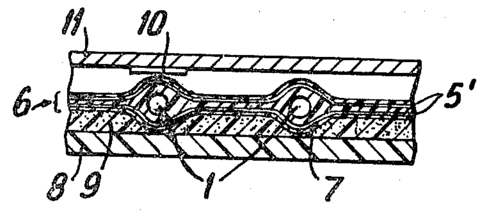
FIG. 4C is a cross section taken along the line C–C′ of FIG. 4A.

Referring now to FIG. 4, the semi-permanent memory device of a preferred embodiment comprises a lattice plane 6 consisting of a plurality of the magnetic wires 1 of FIG. 1B arranged in parallel with each other, a plurality of 3-turn-driving wires 5′ arranged to intersect at right angles with the magnetic wires 1, and an insulating material 7 holding the magnetic and driving wires in position. The lattice plane 6 is fixed on an insulating substrate 8 by a suitable adhesive agent or a double-faced adhesive tape 9. Upon the predetermined intersections of the magnetic wires 1 and the driving wires 5′, small magnets 10 of 0.025 mm. thick, 0.9 mm. wide, and 0.9 mm. long made of "Vicalloy" (an alloy of 50% Co, 38% Fe, and 12% Va) and supported by a 0.5 mm. thick duralumin plate 11 are disposed in such a manner that the direction of their N to S poles may coincide with the axial direction of the magnetic wire 1, with the interval between the centre of the magnetic wire 1 and the surface of the small magnet 10 being approximately 0.3 mm. With the memory device of FIG. 4, current pulses $I_D$ and $I_W$ were made to flow through the magnetic wire and the driving wire, respectively, the intersection of which has no small magnet, and through another magnetic and driving wires, respectively, the intersection of which has a small magnet, in the same manner as described above with reference to FIGS. 1 to 3. FIG. 5 shows the waveforms of the resulting output voltages. The waveform 12 is the output voltage obtained from the intersection having no small magnet and corresponds to the waveform $V_{out}$ of FIG. 2, while another waveform 13 is of that obtained from the intersection where a small magnet exists. This result reveals that a small magnet can make the output voltage completely disappear. As is clear from the foregoing, use of the magnetic wire having the hard-and-soft-magnetic films in place of the twistor wire makes it possible to obtain the semi-permanent memory device in which information can be stored, just like in the twistor memory device, depending upon the presence or absence of a small magnet at the intersections of the magnetic wire and driving wire. Incidentally, the intervals between the adjacent magnetic wires and between the adjacent driving wires should be more than 3 mm. and not more than 5 mm., respectively, in the above specific embodiment shown in FIG. 4, because the shorter intervals will result in that a small magnet remarkably lowers the output voltage to be obtained from the adjacent intersection having no small magnet.

Referring to FIG. 6A, the lattice 6′ made by the magnetic wires 1 and the driving wires 5″ may have various configurations. In detail, one set of driving wires 5″ may take *n*-turn ($n$=1, 2, 3 . . . ). Furthermore, as shown in FIG. 6B, a driving wire may be either of a tape-like form 5″–1 or of a round wire form 5″–2, while a driving wire may intersect with the magnetic wires in the form **5″–*a*, 5″–*b*, or 5″–*c* as shown in FIG. 6C. Thus, the combination of the forms 5″–1 and 5″–2 and the forms 5″–*a*, 5″–*b*, and 5″–*c*** are possible for the driving wires.

In the foregoing, explanation has been given wholly about such a magnetic wire that has the easy axis of magnetization in the circumferential direction thereof. However, the same type of semi-permanent memory device having the same advantages can be also obtained by aligning the easy axes of magnetizations of the hard-and-soft-magnetic films in the axial direction of the core wire, using the magnetic wire thus made to have the easy axis of magnetization in its axial direction as a driving wire, and using the conductive wire intersecting at right angles with the magnetic wire as not a driving wire but a sense wire of information.

While the invention has been particularly shown and described with reference to a preferred embodiment thereof, it will be understood by those skilled in the art that various modifications in form and details may be made therein without departing from the spirit and scope of the invention.

What is claimed is:

1. A semi-permanent memory device comprising:

a plurality of magnetic wires arranged in parallel with each other, said magnetic wire consisting essentially of a non-magnetic conductive wire, a first thin film of a hard magnetic material formed on said conductive wire, and a second thin film of a soft magnetic material formed on said first film, said first and second films having uniaxial magnetic anisotropy and substantially rectangular hysteresis characteristics;

a plurality of elongated non-magnetic conductors intersecting at substantially right angles with said magnetic wires;

the easy axes of magnetization of said first and second thin films being aligned in the same predetermined direction;

a plurality of magnetized small magnets disposed in the vicinities of predetermined intersections of said magnetic wires and said elongated conductors; and means for providing fields on said magnetic wires of magnitudes insufficient to reverse the magnetization direction of said first film, but of sufficient magnitude to reverse the direction of magnitude of said second film.

2. The semi-permanent memory device according to claim 1, wherein said soft magnetic material is an alloy of Fe-Ni and said hard magnetic material is selected from the group consisting of Co, Co-Ni alloy, Co-Fe alloy and Co-Fe-Ni alloy, respectively.

3. The semi-permanent memory device according to claim 2, wherein the thickness of said second thin film ranges from 6,000 to 12,000 angstroms, while that of the said first thin film ranges from 250 to 500 angstroms.

4. The semi-permanent memory device of claim 1, in which the axes of magnetization of said first and second thin films are aligned in the same circumferential direction.

5. The semi-permanent memory device of claim 1, in which the axes of magnetization of said first and second thin films are in the axial direction of said non-magnetic conductors.

References Cited

UNITED STATES PATENTS 3,133,271 5/1964 Clemons ---------- 340—174

OTHER REFERENCES

Publication I—IBM Technical Disclosure Bulletin, vol. 8, No. 11, April 1966, pp. 1609–1610.

JAMES W. MOFFITT, Primary Examiner